(12) United States Patent
Ancelin et al.

(10) Patent No.: US 11,014,596 B2
(45) Date of Patent: May 25, 2021

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Matthias Ancelin, Altstätten (CH); Hieronymus Schnitzer, Gamprin (LI); Tobias Heeb, Ruggell (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 201 days.

(21) Appl. No.: 16/088,154

(22) PCT Filed: Mar. 23, 2017

(86) PCT No.: PCT/EP2017/056914
§ 371 (c)(1),
(2) Date: Sep. 25, 2018

(87) PCT Pub. No.: WO2017/167632
PCT Pub. Date: Oct. 5, 2017

(65) Prior Publication Data
US 2019/0054948 A1 Feb. 21, 2019

(30) Foreign Application Priority Data
Mar. 31, 2016 (DE) .................... 10 2016 205 378.7

(51) Int. Cl.
*B62D 1/19* (2006.01)
*B62D 1/185* (2006.01)

(52) U.S. Cl.
CPC ............. *B62D 1/192* (2013.01); *B62D 1/185* (2013.01)

(58) Field of Classification Search
CPC ................................ B62D 1/192; B62D 1/185
See application file for complete search history.

(56) References Cited

U.S. PATENT DOCUMENTS

| 126,222 | A | | 4/1872 | Mason | |
|---|---|---|---|---|---|
| 3,597,993 | A | * | 8/1971 | Ripley | ................... B62D 1/192 74/492 |

(Continued)

FOREIGN PATENT DOCUMENTS

| AU | 442041 B | | 4/1973 |
|---|---|---|---|
| AU | 5142973 A | * | 4/1973 |

(Continued)

OTHER PUBLICATIONS

English Translation of International Search Report issued in PCT/EP2017/056914, dated Jun. 12, 2017 (dated Jun. 28, 2017).

*Primary Examiner* — Paul N Dickson
*Assistant Examiner* — Joselynn Y Sliteris
(74) *Attorney, Agent, or Firm* — thyssenkrupp North America, LLC

(57) ABSTRACT

A steering column for a motor vehicle includes a case with a steering gear-side end and a steering wheel-side end. The case includes an outer casing tube in which an inner casing tube is arranged telescopically and in which a steering spindle is mounted rotatably about a longitudinal axis. The steering spindle includes a hollow shaft in which a steering shaft is arranged telescopically. The steering spindle is mounted rotatably in a rear bearing in the steering wheel-side end portion. A safety element may be arranged between the steering gear-side end of the case and the rear bearing between the case and the steering spindle, which leaves a circumferential radial safety distance between the case and steering spindle which is smaller than the radial distance between the case and steering spindle outside the safety element between the steering gear-side end of the case and the rear bearing.

16 Claims, 5 Drawing Sheets

(56) References Cited

U.S. PATENT DOCUMENTS

| | | | | |
|---|---|---|---|---|
| 3,597,994 | A | | 8/1971 | Shiomi |
| 3,600,970 | A | * | 8/1971 | Loofbourrow ......... B62D 1/192 74/492 |
| 3,665,777 | A | * | 5/1972 | Jensen ................... B62D 1/192 74/492 |
| 3,699,824 | A | * | 10/1972 | Staudenmayer ....... B62D 1/192 74/492 |
| 3,877,319 | A | * | 4/1975 | Cooper .................. B62D 1/192 74/492 |
| 4,142,423 | A | * | 3/1979 | Ikawa ..................... B60R 22/28 188/374 |
| 5,758,545 | A | * | 6/1998 | Fevre ..................... B62D 1/185 280/775 |
| 7,168,741 | B2 | * | 1/2007 | Kinme ................... B62D 1/192 280/777 |
| 8,596,160 | B2 | * | 12/2013 | Nagamura ............. B62D 1/185 74/492 |
| 8,733,201 | B2 | * | 5/2014 | Okano ................... B62D 1/184 74/492 |
| 9,108,672 | B2 | * | 8/2015 | Watanabe .............. B62D 1/184 |
| 9,604,661 | B2 | * | 3/2017 | Watanabe .............. B62D 1/185 |
| 10,378,577 | B2 | * | 8/2019 | Wilkes ................... F16C 33/46 |
| 2005/0173914 | A1 | | 8/2005 | Sadakata |
| 2007/0126222 | A1 | | 6/2007 | Koya |
| 2015/0314801 | A1 | | 11/2015 | Gstöhl |

FOREIGN PATENT DOCUMENTS

| | | | | |
|---|---|---|---|---|
| CN | 1662411 | A | | 8/2005 |
| CN | 104968555 | A | | 10/2015 |
| DE | 10130908 | A | | 1/2003 |
| GB | 2408970 | A | | 6/2005 |
| GB | 2459959 | A | * | 11/2009 ............. F16C 19/06 |
| JP | S60-171778 | U | | 11/1985 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2017/056914, filed Mar. 23, 2017, which claims priority to German Patent Application No. DE 10 2016 205 378.7, filed Mar. 31, 2016, the entire contents of both of which are incorporated herein by reference.

FIELD

The present disclosure generally relates to a steering column for a motor vehicle with higher functional safety.

BACKGROUND

In the case of length-adjustable steering columns, the steering wheel attached to the rear end of the steering spindle in terms of the direction of travel can be positioned in the vehicle interior by a length adjustment in the longitudinal direction, i.e. in the direction of the steering column longitudinal axis, and as a result adapted to the driver position. The adjustability can be realized in that the casing unit comprises a coaxial arrangement of casing tubes which are displaceable in the direction of the longitudinal axis, i.e. which is axially telescopic, and in the case of which inner casing tube is received axially displaceably in an outer casing tube. Like the casing unit, the steering spindle arranged coaxially therein is also formed to be length-adjustable in that a steering shaft is also received telescopically in a hollow shaft. For transmission of the steering torque, the hollow shaft and the steering shaft are connected to one another in a torque-locking manner by positive engagement.

A further advantage is that, in the event of a vehicle crash, if the driver hits the steering wheel, the steering column can be pushed together in the longitudinal direction. As a result, the steering column can be effectively prevented from penetrating further into the interior of the passenger compartment and leading to injuries to the occupants. Moreover, the impact energy in the crash can be reduced in a controlled manner by energy-absorption apparatuses arranged between the telescopic casing tubes or between the casing unit and a support unit of the steering column in order to reduce the risk of injury.

In the event of a crash, the forces introduced into the steering spindle practically always have a force component transverse to the longitudinal axis, which leads to a radial deflection of the steering spindle, in particular in the case of what is known as an offset crash, in the case of which the body strikes the steering wheel at an angle to the longitudinal axis. The deflection of the steering spindle can lead to the steering shaft not, or only with greatly increased axial force, being pushed into the hollow shaft, as a result of which the axial force required to telescope the steering column, what is known as the crash level, is increased in an uncontrolled manner up to locking of the steering column. A safety risk arises as a result of this.

A generic steering column in the case of which the steering shaft should be stabilized is known, for example, from US 2007/0126222 A1. Therein, the hollow shaft of the steering spindle is mounted on one side in a front anti-friction bearing, which is fitted in the front end of the outer casing tube, and on the other side the steering shaft which is telescopic in the hollow shaft is mounted in a rear anti-friction bearing, which is fitted in the rear, steering wheel-side end of the inner casing tube. In this known steering column arrangement, the steering spindle is additionally mounted in the casing unit at an intermediate position in the longitudinal region between the front and rear bearing in a third bearing. This intermediate bearing is also formed as an anti-friction bearing and defines an additional coaxial support of the hollow shaft in the outer casing tube. The rigidity of the steering spindle should be reduced and the transmission of vibrations to the steering wheel should be reduced by the additional, radial play-free support in the intermediate bearing.

It is, however, disadvantageous that the breakaway torque of the steering spindle is increased by the additional bearing as a result of the bearing friction. In particular, the third bearing is, as a result of the overdetermined arrangement between the front and rear bearing, particularly sensitive with respect to tolerances of the steering spindle, and can be impaired in terms of its function or damaged, which can lead to a higher breakaway torque. The high tolerance requirements further result in a correspondingly high manufacturing and assembly outlay. High forces are furthermore required for telescopic adjustment since a steering spindle is moved with an already small radial runout by the telescoping into a forced position as a result of the additional bearing.

Thus a need exists for an improved steering column which offers higher functional safety and requires little outlay.

DETAILED DESCRIPTION

Figure 1:
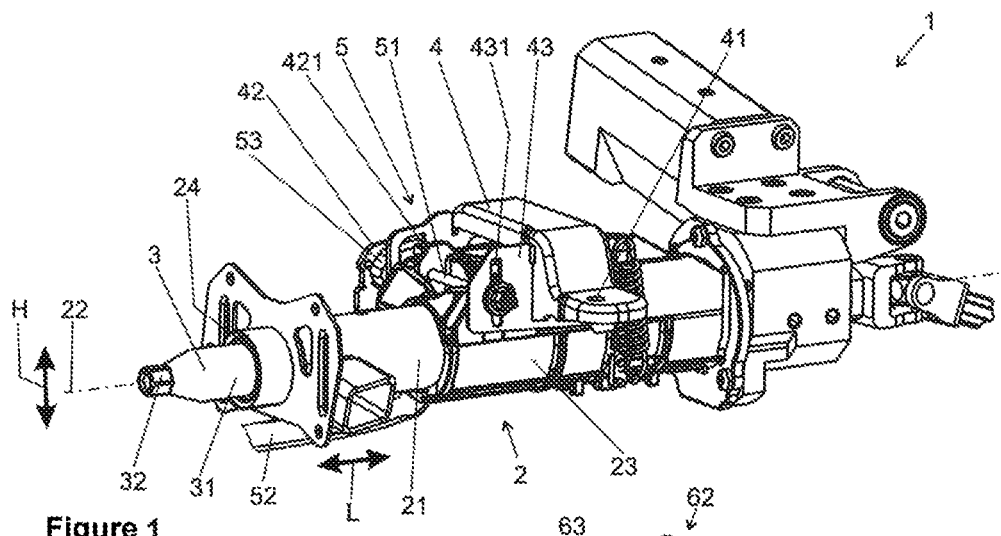
FIG. 1 is a schematic perspective view of a manually adjustable steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, including a casing unit with a steering gear-side end and a steering wheel-side end, wherein the casing unit includes an outer casing tube in which an inner casing tube is arranged telescopically, and in which a steering spindle is mounted rotatably about a longitudinal axis, wherein the steering spindle includes at least in portions a hollow shaft in which a steering shaft is arranged telescopically, and the steering spindle is mounted rotatably in a rear bearing in the steering wheel-side end portion of the casing unit.

In some examples, a safety element is arranged between the steering gear-side end of the casing unit and the rear bearing between the casing unit and the steering spindle, which safety element leaves a circumferential radial safety distance between casing unit and steering spindle which is smaller than the radial distance between casing unit and steering spindle outside the safety element between the steering gear-side end of casing unit and the rear bearing.

The safety element according to the invention forms a radial restriction for the steering spindle within the casing unit. The radial restriction ensures in the event of a crash that the local radial offset of the steering spindle as a result of the deflection which occurs can occur at most within the safety distance. As a result of the then occurring radial stopping of the steering spindle or the casing unit on the safety element, the radial deflection of the steering spindle is restricted to a maximum value as a result of the deflection between the front and the rear bearing. This maximum value can be defined by dimensioning the radial safety distance and the distance of the rear, steering wheel-side bearing to the safety element in relation to the axial bearing distance between the rear and the front bearing. As a result of this, the deflection in the event of a crash can be restricted to an admissible degree so that the steering column can in any event be safely pushed together and an admissible threshold force for telescopic pushing together of the steering spindle is not exceeded.

The steering spindle is preferably mounted in a front bearing in the steering gear-side end portion or is supported outside the casing unit.

In contrast to the intermediate bearing known in the prior art, the safety element according to the invention, during normal operation of a steering column, does not form any mechanical connection between the steering spindle and the casing unit. The safety element is arranged in a contact-free manner in relation to the steering spindle or the casing unit, wherein the radial distance is defined by the safety distance. The safety distance is realized by a local reduction in the radial distance within the axial width of the safety element, i.e. its dimension in the direction of the longitudinal axis.

One advantage of the safety element according to the invention is that the maximum deflection of the steering spindle in the event of a crash is restricted to an acceptable threshold value. During normal operation, it is advantageous that, as a result of the contact-free arrangement, no bearing friction can occur in the safety element as in the prior art in the intermediate bearing. The dimension and form tolerances of the steering spindle in the radial direction furthermore lie significantly, generally in terms of magnitude below the level of the safety distance. Consequently, it is a further advantage that the function of the steering is not impaired by the normal manufacturing tolerances. The production outlay can correspondingly be lower than in the prior art. Moreover, no additional bearing is required. A further advantage of the safety element according to the invention is that excessive deflection of the steering spindle is prevented if a torque is introduced into the steering shaft and said steering shaft is locked against rotation by a lock bolt of an immobilizer, for example, a steering wheel lock. In such cases, the steering spindle is deflected and the steering spindle comes to lie against the safety element. Further deflection is thus prevented and a jumping of the lock bolt out of a latching opening of a latching star fixed on the steering spindle cannot thus occur.

The safety element has a defined width in the axial direction which is smaller than the axial bearing distance between the front and the rear bearing. As a result, it delimits an axial safety portion with its width. The width of the safety portion is preferably smaller than the diameter of the safety element.

It is advantageous that the safety element is arranged in a longitudinal region of the hollow shaft in which the steering shaft can be introduced axially into the hollow shaft, preferably in an end region of the hollow shaft. The steering shaft is introduced or pushed in telescopically in the axial direction into the open end. Depending on the respective adjustment position in the longitudinal direction, the steering shaft dips in normal operation in the longitudinal direction to a greater or lesser extent into the end region in the opening cross-section of the hollow shaft. The steering shaft is guided linearly in the hollow shaft displaceably in the longitudinal direction in a plain bearing or anti-friction bearing. During normal operation, this mounting has little play, in the case of an anti-friction bearing is almost play-free in the radial direction. As a result of the bending strain which occurs in the event of a crash, however, significant radial forces are exerted on the mounting so that, in inexpedient conditions, greater deflection can occur in particular in the end region of the hollow shaft at the transition to the steering shaft. The maximum deflection can therefore be restricted particularly effectively by a positioning of the safety element according to the invention in the end region of the hollow shaft, where the steering shaft is introduced.

The safety element can preferably be arranged in a longitudinal region in which the hollow shaft extends within the casing unit and is preferably located within the inner casing tube. The spatial arrangement between hollow shaft and inner casing tube in the axial direction is maintained even in the event of a crash. As a result of this, it is ensured that the annular element is reliably available at all times for the radial support according to the invention of the steering spindle.

A casing unit length is determined from the distance between the rear bearing and the steering gear-side end of the casing unit, wherein the safety element is preferably arranged in the center of the casing unit length ±25% of the casing unit length, preferably ±10% of the casing unit length and very particularly preferably ±5% of the casing unit length. The term "center of the casing unit length" refers to half the distance between the rear bearing and the steering gear-side end of the casing unit. When determining the casing unit length, the maximum distance between the rear bearing and the steering gear-side end of the casing unit should be assumed, i.e. if the inner casing tube is telescoped as far as possible out of the outer casing tube.

One preferred embodiment of the invention provides that the safety element is formed as an annular element. The annular element, due to its function, also referred to in short as a crash ring, has between its inner and outer diameter a radial annular width which is smaller in terms of magnitude than the radial distance between the outer circumference of the steering spindle and the inner circumference of the casing unit in the longitudinal region between the front bearing or the steering gear-side end of the casing unit and the rear bearing. The difference between the radial distance and the annular width correspondingly forms the remaining safety distance according to the invention so that the steering spindle can deflect maximally in the event of a crash.

It is advantageous that the annular element is arranged in the casing unit and surrounds the steering spindle with the radial safety distance. The annular element is preferably arranged coaxially to the steering spindle in relation to the longitudinal axis so that the steering spindle passes centrally through the opening of the annular element, wherein the safety distance is defined by the free annular gap which extends over the entire circumference of the steering spindle. The annular element can be fixed in the casing unit. The open diameter of the casing unit between the front and rear bearing is reduced locally by the annular element. In the region of the axial width of the annular element, the steering spindle can consequently only deflect so far until it stops radially with its outer circumference within the opening of the annular element.

The annular element can be manufactured as a separate component which has the basic form of a hollow cylindrical sleeve which can be inserted in the axial direction into the open end of the casing unit and be fixed. Fixing in the axial direction can be performed by a non-positive and/or positive-locking and/or substance-to-substance connection, for example, by pressing in. Where applicable, gluing or welding can be performed, or positive-locking elements for axial and/or circumferential fixing can be provided.

The safety element formed as an annular element preferably comprises flexible tongues which extend to the outside. In other words, the annular element is formed as a retaining ring. These flexible tongues preferably extend in the radial direction ±15° to the outside and are pretensioned during introduction of the annular element into the open end of the casing unit. As a result of the pretensioned flexible tongues, the annular element remains at its mounted position after mounting in the casing unit. The annular element can be formed from a spring steel. The annular element preferably comprises a shoulder which extends in the axial direction and which is preferably formed to be circumferential. As a result of this shoulder, an enlarged inner casing surface of the annular element is created on which the steering can be supported in the event of deflection.

It is alternatively conceivable and possible that the safety element comprises a radial shaping, running at least in portions over the circumference of the casing unit, of the inner or outer casing tube. The annular element can be formed in one piece with the casing unit such that the inner or outer casing tube comprises a bead formed at least in portions over its circumference from the outside into the casing tube wall. In other words, the casing tube and the safety element are formed as an integral one-piece component. This radial form formed as a bead extends over a predetermined width in the axial direction. In the radial direction, the bead is formed so deep into the wall that the radial safety distance according to the invention remains between the locally reduced inner diameter in the region of the bead and the steering spindle.

The safety element can preferably be arranged or formed in the inner casing tube. As a result, in the event of a crash, it cannot collide with other components of the casing unit, which is beneficial in terms of functional safety.

It is alternatively possible to arrange and fix the annular element on the steering spindle. In this arrangement, the radial safety distance according to the invention is located between the outer circumference of the safety element and the inner circumference of the casing unit. For example, the annular element can be formed as described above as a sleeve or retaining ring which is fitted with its through-opening on the steering spindle, preferably on the hollow shaft, preferably in a longitudinal region which extends within the inner casing tube. Fixing on the steering spindle can be carried out by means of suitable non-positive, positive-locking and/or substance-to-substance connections.

During fitting on the steering spindle, the annular element should have as low as possible a mass moment of inertia in terms of a rotation about the longitudinal axis so that the steering movement is influenced to as small a degree as possible.

The safety element can preferably be formed from plastic material. For example, an annular element can be formed as a plastic sleeve which has a low weight and mass moment of inertia, can be manufactured with low outlay, in a low-cost manner and true to size, for example, as an injection molded part, and is easy to mount, for example by pressing in or on.

It is furthermore advantageous that the safety element is configured to be at least partially friction-reducing. The components of the casing unit and the steering spindle are normally manufactured from metal, preferably from steel, aluminum and the like. In the event of a crash, the deflected steering spindle comes into contact with the safety element, or the safety element with the casing unit.

One preferred embodiment of the invention provides that an energy-absorption apparatus is arranged between the outer casing tube and the inner casing tube. Such an energy absorption apparatus, which is known per se, ensures in the event of a crash that the body striking the steering wheel is braked in a controlled manner during telescoping pushing together of the steering column. This is performed in that kinetic energy of the casing tubes which have moved relative to one another in the longitudinal direction is absorbed in the energy-absorption apparatus, i.e. is converted into deformation energy and heat, for example, by plastic deformation of bending and/or rupturing elements.

Identical parts are always provided with the same reference numbers in the various figures and are also therefore respectively only generally cited or mentioned once.

FIG. 1 shows a perspective view of a steering column 1, wherein the rear end in terms of the direction of travel is directed obliquely to the left in front of the observer.

Steering column 1 comprises a casing unit 2 with an inner casing tube 21 which is received coaxially in relation to a longitudinal axis 22 in an outer casing tube 23 and is telescopic in longitudinal direction L, which is indicated by the double arrow.

A steering spindle 3 is mounted rotatably in casing unit 2 coaxially about longitudinal axis 22. Steering spindle 3 comprises a hollow shaft 31 which projects to the rear out of inner casing tube 21 and comprises at its end facing the driver a fastening portion 32 for attachment of a steering wheel, not represented.

A support unit 4 comprises fastening means 41 for fastening steering column 1 to a vehicle body, not represented. Casing unit 2 is arranged with its outer casing tube 23 between side walls 42 and 43, which are opposite one another transverse to the longitudinal axis, of support unit 4.

A clamping apparatus 5 has a clamping bolt 51 which extends through slot-like openings 421 and 431 in side walls 42 and 43 and through-openings in casing unit 2. The clamping apparatus can be moved into the fixing position by clamping bolt 51 by manual actuation of a clamping lever 52 via a clamping gear 53, which can be formed in a manner known per se as a cam, wedge or tilting lever gear, wherein a clamping force is exerted on side walls 42 and 43. Outer casing tube 23 is clamped in a non-positive manner between side walls 42 and 43 by this clamping force and as a result fixed relative to support unit 4 and thus also relative to the vehicle body.

If clamping apparatus 5 is moved into the release position by actuating clamping lever 52 so that no clamping force acts any more, the clamping bolt 52 can be displaced up-wards or downwards in openings 421 and 431 so that an adjustment of a steering wheel attached to fastening portion 32 in vertical direction H is possible, as indicated with the double arrow.

In the fixing position, outer casing tube 23 is also tensioned radially on inner casing tube 21 so that the steering wheel position is fixed in the longitudinal direction. In the release position, the tensioning is released so that inner casing tube 21 is adjustable in longitudinal direction L relative to outer casing tube 23. In detail, inner casing tube 2 can be pushed forwards—in the representation from left to right—into the opening cross-section of outer casing tube 23 and positioned for adjustment of the longitudinal position in longitudinal direction L. Clamping apparatus 5 can be fixed by actuating clamping lever 52, wherein inner casing tube 21 is clamped fixedly in the set longitudinal position in a frictionally engaged manner in outer casing tube 23. As the same time, casing unit 2 is clamped and fixed in the set height position in vertical direction H between side walls 42 and 43 also in a frictionally engaged manner.

Figure 2:
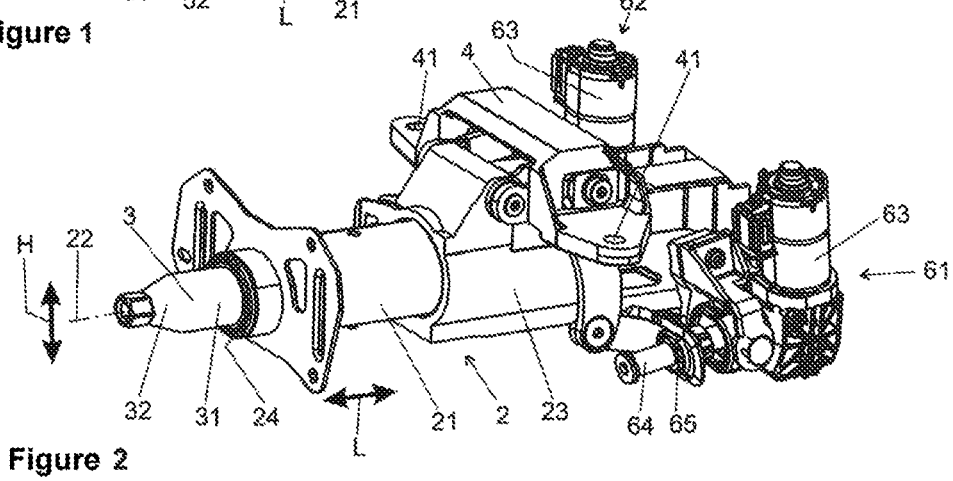
FIG. 2 is a schematic perspective view of an electrically adjustable steering column.

FIG. 2 shows in the same view as FIG. 1, which has, for motor-operated adjustment in vertical direction H, a motor-operated actuating drive 61 and, for motor-operated adjustment in longitudinal direction L, a motor-operated actuating drive 62. Actuating drives 61 and 62 have in each case an electric motor 63, by which in each case a spindle 64 and a spindle nut 65 can be driven rotationally relative to one another so that inner casing tube 21 can be adjusted relative to outer casing tube 23 in longitudinal direction L, and correspondingly casing unit 2 relative to support unit 4 in vertical direction H.

In order to enable length adjustability, steering spindle 3 is also configured telescopically in the longitudinal direction. As can be inferred from longitudinal sections represented in FIGS. 6 and 7, for this purpose, a steering shaft 33 is also inserted telescopically in the longitudinal direction into the opening at front, open end 311 of hollow shaft 31. For transmission of the steering torque introduced via the steering wheel into hollow shaft 31, steering shaft 33 engages with a non-round profile cross-section into a corresponding profile cross-section of hollow shaft 31 in a torque-locking manner. Hollow shaft 31 can have, for example, a multi-edge profile which is apparent in FIG. 4 which shows a view of the front end, facing away from fastening portion 32, of inner casing tube 21 which is shown in the removed state in FIG. 3.

Figure 3:
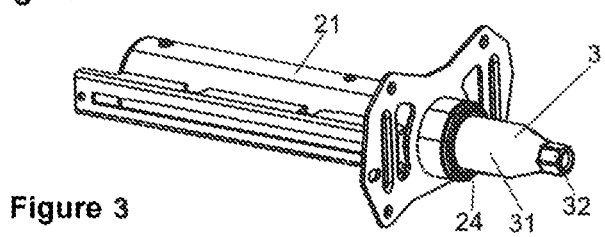
FIG. 3 is a partial schematic perspective view of an inner casing tube of a steering column according to FIG. 1 or 2 on its rear end.
Figure 4:
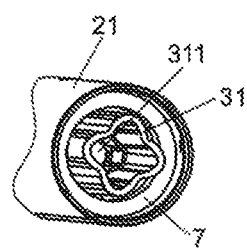
FIG. 4 is a partial view of the front end of the inner casing tube according to FIG. 3.
Figure 6:
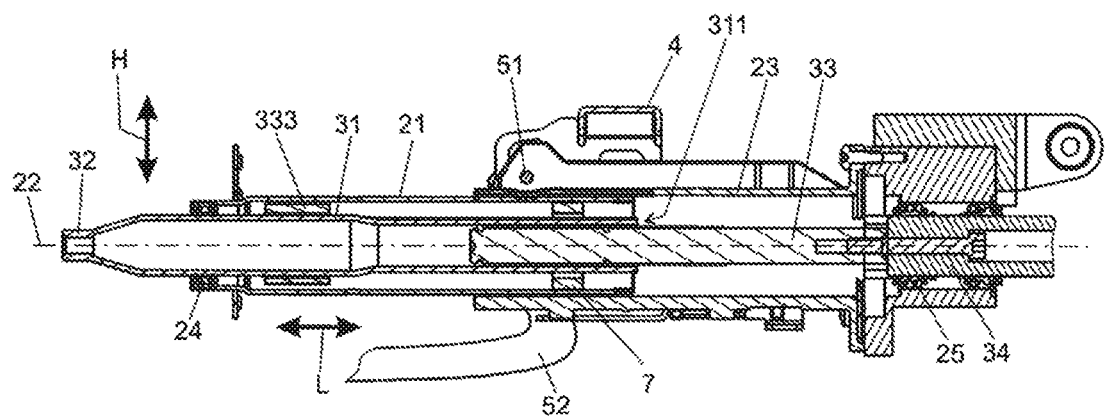
FIG. 6 is a longitudinal sectional view through a steering column according to FIG. 1 in the normal operating state.
Figure 7:
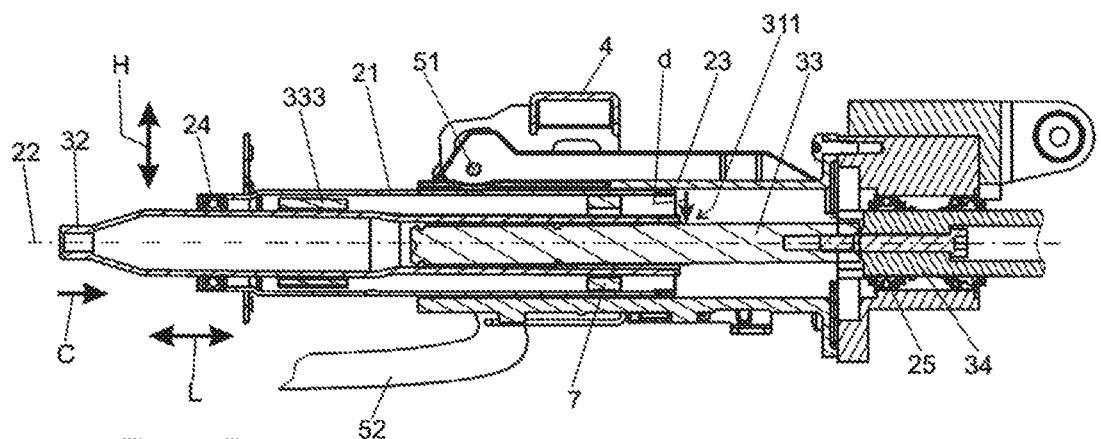
FIG. 7 is a longitudinal sectional view through a steering column as in FIG. 4 after a crash.

The coaxial arrangement of hollow shaft 31 in inner casing tube 21 can be inferred from FIG. 3 and FIG. 4, as well as the sectional views from FIGS. 6 and 7. Hollow shaft 31 is mounted rotatably in the rear, i.e. steering wheel-side end of inner casing tube 21 in a first bearing 24, which bearing 24 is preferably formed as an anti-friction bearing. The length of hollow shaft 31 is dimensioned so that it, at its front end where opening 311 is located, terminates approximately with the front end of inner casing tube 21.

Steering shaft 33 inserted with its rear portion into hollow shaft 31 axially into hollow shaft 31 comprises a front bearing portion 34, where it is mounted rotatably in a second bearing 25, rotatably in the front end region of outer casing tube 23 about longitudinal axis 22.

Steering spindle 3 is retained and mounted in each case at the rear and front end in casing unit 2 in the radial direction in a coaxially defined manner by first bearing 24, also referred to as rear or steering wheel-side bearing 24, and second bearing 25, also referred to as front or steering gear-side bearing 25.

Inner casing tube 21 is, during normal operation of the motor vehicle, fixed in a frictionally engaged manner for positioning of the steering wheel in longitudinal direction L relative to outer casing tube 23. If, however, in the event of a crash, a high crash force is exerted in longitudinal direction L in a forward direction on inner casing tube 21 by a body of a vehicle occupant striking the steering wheel, it is pushed forwards axially into outer casing tube 23 while overcoming the frictionally engaged fixing.

Figure 8:
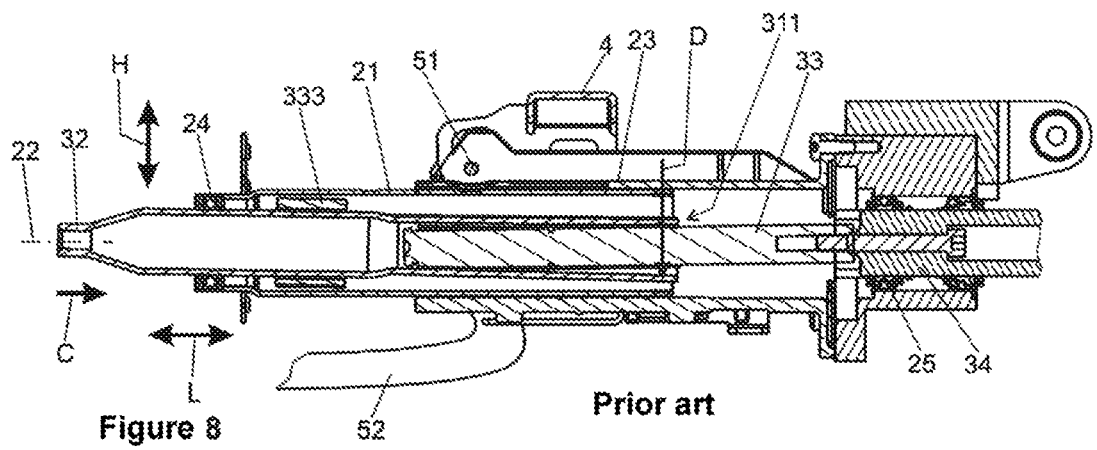
FIG. 8 is a longitudinal sectional view through a steering column according to the prior art after a crash.

The situation of a casing unit 2 which is partially pushed together in the event of a crash by a crash force C—indicated by arrow C—in the case of a steering column 1 according to the prior art is represented in FIG. 8. It is apparent therein that steering spindle 3 comprises in its longitudinal extension between first bearing 24 and second bearing 25 a deflection D, plotted with arrow D. As a result of deflection D, hollow shaft 31 is no longer oriented coaxially in inner casing tube 21, as in the normal operating state which is shown for a steering column 1 according to the invention in FIG. 6. The opening of hollow shaft 31, which is bent downwards in the drawing, is offset downwards in the open end region (to the right in the representation) of inner casing tube 31 so that steering shaft 33 is bent, i.e. deflected, relative to hollow shaft 31.

The situation represented in FIG. 8 can lead to steering shaft 33 being wedged in hollow shaft 31 in such a manner that casing unit 2 cannot be pushed together by crash force C acting in the event of a crash so that steering column 1 does not recoil forwards and injuries can arise.

Figure 5:
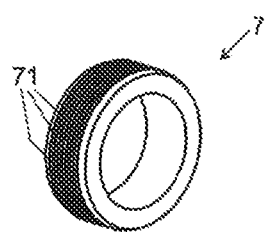
FIG. 5 is a partial view of a safety element.

Steering column 1 according to the invention comprises a safety element according to the invention which is formed in a first embodiment as annular element 7. Annular element 7 is represented on its own in FIG. 5. It is formed substantially as a hollow cylindrical bushing and is preferably composed of a plastic material. On its outer circumference, it is provided with a profiling 71, for example, with circumferential ribs or a fluting.

Annular element 7 is inserted coaxially into the open end of inner casing tube 21, as is apparent in FIG. 4. Fixing can be carried out by axial pressing in, wherein profiling 71, which has a slight oversize with respect to the inner diameter of inner casing tube 21, is plastically and elastically deformed during pressing in and ensures a secure non-positive seat in inner casing tube 21. Alternatively or additionally, a materially bonded connection can be carried out by means of gluing or welding.

It is apparent from FIG. 6 that annular element 7 in the normal operating state encloses hollow shaft 31, which is then arranged coaxially in inner casing tube 21, on all sides with radial spacing. This is the safety distance according to the invention. Annular element 7 correspondingly has no mechanical contact with steering spindle 3. Consequently, no friction acts counter to a rotation of steering spindle 3 by annular element 7. A slight offset of steering spindle 3 within casing unit 2 as a result of component and manufacturing tolerances, which are smaller in terms of magnitude than the radial safety distance between the outer circumference of hollow shaft 31 and the inner circumference of annular element 7, also have no disadvantageous effect.

Annular element 7 is preferably arranged in the end region of hollow shaft 31, and indeed in longitudinal direction L in the vicinity of opening 311 so that annular element 7 is located in a longitudinal region in which steering shaft 33 plunges into opening 311. In other words, annular element 7 engages around steering shaft 33 which telescopes in hollow shaft 31.

In the event of a crash, which is represented in FIG. 7, steering shaft 3 can be deflected transverse to longitudinal axis 22, downwards in the drawing. In the case of the invention, maximum possible deflection d is, however, restricted in that steering spindle 3, in the example shown hollow shaft 31, can be displaced at most by the safety distance between the outer diameter of hollow shaft 31 and the inner diameter of annular element 7 out of longitudinal axis 22 until hollow shaft 31 stops radially on the inside against annular element 7. Maximum possible deflection d is thus significantly smaller than deflection D in the prior art, which is indicated in FIG. 7 with shorter arrow d.

One advantage of the invention arises from the fact that annular element 7 is not exposed to any relative movement between casing unit 2 and steering spindle 3 as a result of fitting between inner casing tube 21 and hollow shaft 31 in the event of a crash. As a result, safe functioning is ensured and in the event of a crash maximum deflection d is restricted to a smaller value than in the prior art. This ensures that, in the event of a crash, casing unit 2 can be pushed together without the desired flexibility in the axial direction being impaired by a wedging of steering shaft 33 in hollow shaft 31. This results in an advantageous improvement in safety.

Figure 9:
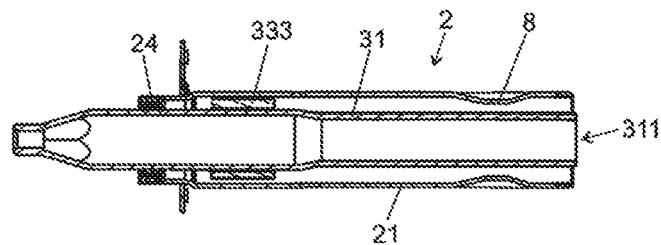
FIG. 9 is a longitudinal sectional view through an inner casing tube in a further embodiment.

FIG. 9 shows a partial longitudinal section through an alternative embodiment of a casing unit 2 configured according to the invention. The safety element according to the invention is formed as a bead 8 formed radially on the outside in the wall of inner casing tube 21 and running over the circumference. The radial safety distance according to the invention corresponds in turn to the radial distance between the outer diameter of hollow shaft 31 and the inner diameter in the region of bead 8.

A safety element according to the invention formed, for example, as annular element 7, bead 8 or in a different design can equally be realized in a manually adjustable steering column 1 according to FIG. 1 or in a electromotor-operated adjustable steering column according to FIG. 2. It is also conceivable and possible to install the safety element according to the invention in a non-adjustable steering column or a steering column which is only height-adjustable if it comprises casing tubes which are telescopically collapsible in the event of a crash.

Figure 10:
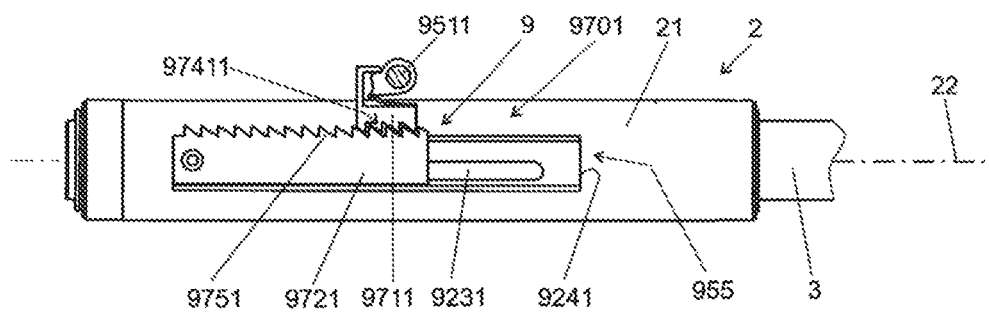
FIG. 10 is a side view of an inner casing tube with a crash apparatus.
Figure 11:
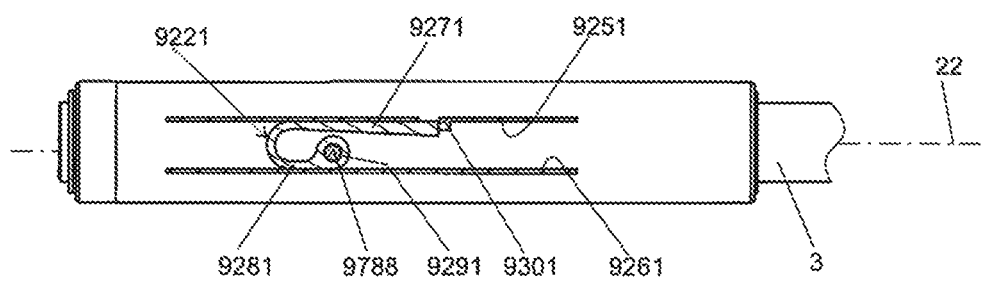
FIG. 11 is a detailed view of the inner casing tube according to FIG. 10 in the normal operating state.
Figure 12:
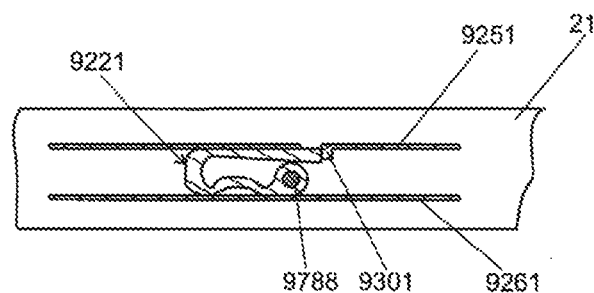
FIG. 12 is a detailed view as in FIG. 11 after a crash.

FIGS. 10, 11 and 12 show an energy-absorption apparatus 9 with a crash activation by manually actuable clamping lever 52 of clamping apparatus 5. Clamping lever 52 is connected non-displaceably to outer casing tube 23 in the direction of longitudinal axis 22 (in longitudinal direction L), i.e. is supported in longitudinal direction L on outer casing tube 23. Energy-absorption apparatus 9 is arranged in the case of a relative movement between inner casing tube 21 and outer casing tube 23 in the event of a crash in the flow of force between inner casing tube 21 and outer casing tube 23.

Energy-absorption apparatus 9 can be activated by actuating clamping lever 52 by means of a crash apparatus 9701. Crash apparatus 9701 comprises locking part 9711 in the form of a toothing stone 9711 and engagement part 9721 in the form of toothed plate 9721. Toothed plate 9721 is connected via an energy-absorption element in the form of a bending wire or strip 9221 to inner casing tube 21 and has, on one lateral surface which is oriented parallel to longitudinal axis 22 and parallel to the axis of rotation of clamping lever 52, positive-locking elements formed as toothing 9751. Toothing stone 9711 has a corresponding toothing 97411 which is opposite toothing 9751 and which can engage in a positive-locking manner in toothing 9751. The teeth of toothing 97411, 9751 preferably have a sawtooth-shaped cross-section. Toothed plate 9711 comprises a driver 9788 which is parallel to the axis of rotation and extends facing casing tube 21.

Toothings 9751 and 97411 can be brought into engagement with one another by rotation of clamping bolt 51 so that in the event of a crash in the case of a relative movement between inner casing tube 21 and outer casing tube 23 a transmission of force is performed from clamping bolt 51 via toothing stone 9711, toothed plate 9721 and bending wire or strip 9221.

Toothed plate 9721 is connected to a bending wire or strip 9221 which is arranged in a housing which is formed by rail 955, which is U-shaped in cross-section, in combination with a portion of inner casing tube 21. Engagement part 9721 comprises for this purpose driver 9788 which is formed by a pin and which protrudes through a slot 9231 in wall 9241 of rail 955. Slot 9231 extends in the direction of longitudinal axis 22. The rail comprises in addition to wall 9241 a lateral limb 9251 and a lateral limb 9261, wherein each of these lateral limbs 9251, 9261 runs substantially parallel to longitudinal axis 22. The term "substantially parallel" refers to a deviation in a spatial angle up to ±10°.

Engagement part 9721 is guided displaceably further in the longitudinal direction of inner casing tube 21 by it via driver 9788 which protrudes through slot 9231. An arrangement of the driver on bending wire or strip 9221 is also conceivable and possible. The displaceable guidance of engagement part 9721 can also be carried out in a different manner to that represented.

Bending wire or strip 9221 possesses limbs 9271, 9281 which are connected via a bend of 180° and which extend substantially in the direction of longitudinal axis 22. Both limbs 9271, 9281 lie against opposite sides of the housing, and indeed against the inner surfaces of lateral limbs 9251, 9261 of rail 955. The roll bending radius of bending wire or strip 2921 is restricted and determined as a result of this in the event of a crash during its deformation, in particular during progressive bending.

For connection of toothed plate 9721 to bending wire or strip 9221, pin-shaped driver 9788 protrudes into a bore 9291 in limb 9281. Other connections of toothed plate 9721 to bending wire or strip 9221 are conceivable and possible.

Other limb 9271, which is not connected to toothed plate 9721, of bending wire or strip 9221 is supported on a stop 9301 of rail 55 by which it is carried along in the case of a displacement of casing unit 2 with respect to support unit 4 in the direction of longitudinal axis 22. Other connections of limb 9271 to the housing, in which bending wire or strip 9221 is arranged, in order to carry along limb 9271 in the event of a crash in the direction of longitudinal axis 22, are conceivable and possible.

The crash apparatus can be activated by rotation of clamping bolt 51. To this end, toothings 9751 and 97411 can be brought into engagement with one another so that a transmission of force is performed from clamping bolt 51 via toothing stone 9711, toothed plate 9721 and bending wire or strip 9221 in the event of a crash in the case of a relative movement between inner casing tube 21 and outer casing tube 23.

If, in the event of a crash, a force which exceeds a threshold value acts in the direction of longitudinal axis 22, inner casing tube 21 is pushed forwards in the direction of longitudinal axis 22 with respect to support unit 4, which supports outer casing tube 23 and is connected fixedly to the vehicle, in a direction pointing towards the front of the vehicle, wherein telescopic portions of the steering column, namely inner casing tube 21 and outer casing tube 23, slide axially into one another and inner casing tube 21 is displaced with respect to toothed plate 9721 retained by toothing stone 9711 and in this case bending wire or bending strip 9221 is deformed. This deformation encompasses in particular the change in the point of bending between limbs 9271, 9281. Energy is absorbed by this plastic deformation of bending wire or strip 9221, as a result of which the movement of inner casing tube 21 relative to outer casing tube 23 is braked in a controlled manner.

In the exemplary embodiment shown, the thickness of limb 9271 increases towards its free end, for example, in a wedge-shaped manner. As a result of this and since the bending wire or strip 9221 is confined between the side walls, formed by lateral limbs 9251, 9261, of the housing, in the case of an increasing displacement of the casing tube with respect to the support unit of the steering column, it finally arises that portion 9281 runs (in the region in which it is provided with bore 9291) onto the thickening region of limb 9271, as a result of which additional deformation work arises as a result of compression.

A desired characteristic curve for energy consumption can be achieved as a result of the geometrical formation of bending wire or strip 9221. To this end, the cross-section of limb 9271 can be formed with a predefined profile over its length in relation to its surface and/or in relation to its contour.

Figure 13:
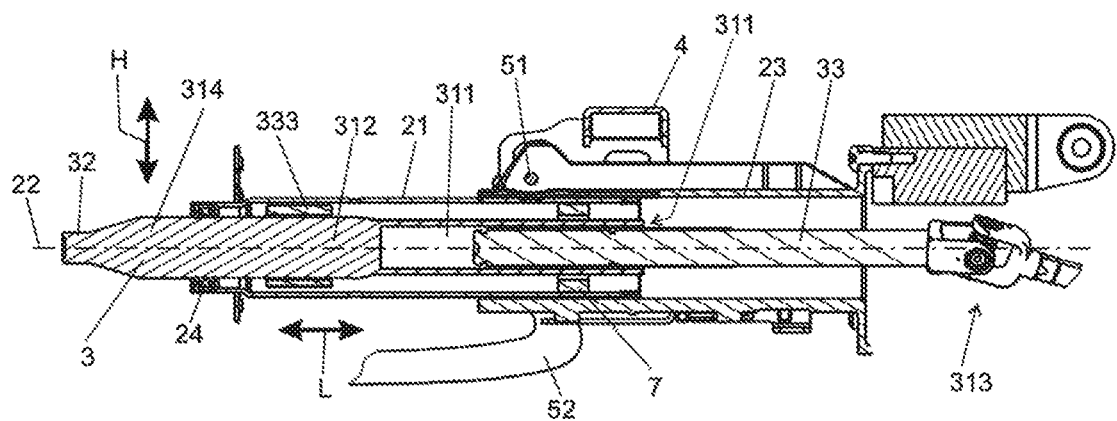
FIG. 13 is a longitudinal sectional view through an alternative steering column in the normal operating state similar to FIG. 6.

A longitudinal section through an alternative steering column according to the invention in the normal operating state similar to FIG. 6 is represented in FIG. 13. Steering spindle 3 comprises a steering shaft 33 which engages into an opening 311 of a hollow shaft 312 in a torque-locking manner. Hollow shaft 312 is formed partially hollow through opening 311, wherein the steering wheel-side end is formed as solid shaft portion 314. In this embodiment, steering shaft 23 is not supported by a front bearing, but rather is retained in the radial direction by a universal joint 313 which connects steering spindle 3 to an input shaft, not represented, of a steering gear. In the event of a crash, safety element 7 according to the invention supports the steering spindle in the radial direction and prevents excessive deflection of steering spindle 3 in the radial direction.

Figure 14:
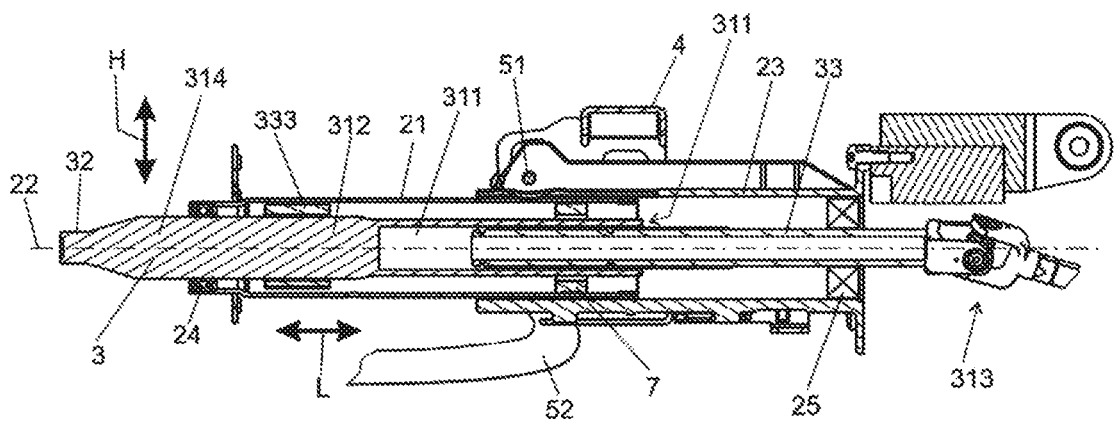
FIG. 14 is a longitudinal sectional view through a further alternative steering column in the normal operating state similar to FIG. 6.

A longitudinal section through a further alternative steering column according to the invention in the normal operating state similar to FIG. 6 is represented in FIG. 14. Steering shaft 33 is formed as a hollow shaft and is connected to a fork of a universal joint 313 in a torque-locking manner. Steering shaft 33 formed as a hollow shaft is mounted rotatably by means of front bearing 25 in outer casing tube 23. Steering shaft 33 engages into an opening 311 of hollow shaft 312. Hollow shaft 312 comprises a steering wheel-side solid shaft portion 314.

Figure 15:
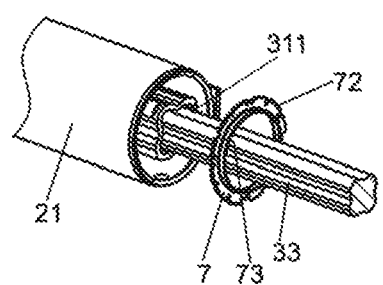
FIG. 15 is a partial view of the front end of the inner casing tube with an alternative safety element formed as a retaining ring.
Figure 16:
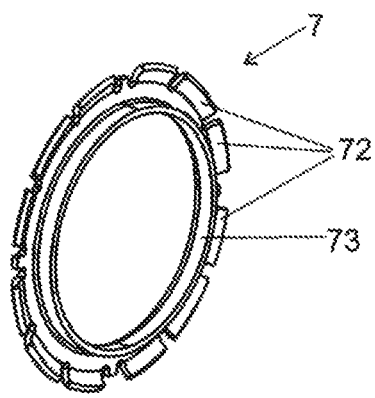
FIG. 16 is a partial view of a safety element in an alternative embodiment according to FIG. 15.
Figure 17:
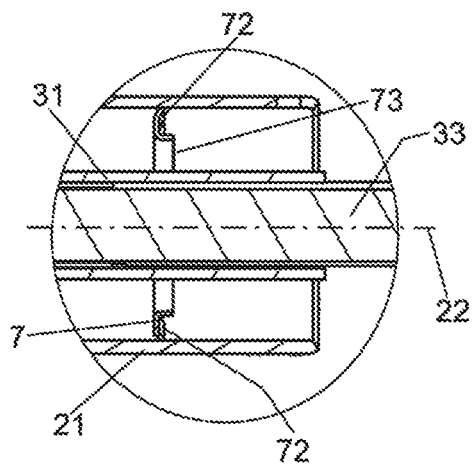
FIG. 17 is a partial longitudinal sectional view of the front end of the inner casing tube according to FIG. 15.

A partial view of the front end of inner casing tube 21 with a safety element 7 formed alternatively as a retaining ring in a partially pulled apart representation is shown in FIG. 15. Safety element 7 formed as a retaining ring is inserted coaxially into the open end of inner casing tube 21, as is apparent in the partial longitudinal section of FIG. 17. Fixing is carried out by axial pressing in, wherein flexible tongues 72, which comprise a slight oversize in relation to the inner diameter of inner casing tube 21, are elastically deformed during pressing in and are thus pretensioned and thus ensure a reliable non-positive seat in inner casing tube 21. Flexible tongues 72 are particularly clearly apparent in FIG. 16. The flexible tongues extend radially to the outside and are slightly angled in relation to a plane which is arranged orthogonally with respect to longitudinal axis 22. Safety element 7 formed as a retaining ring comprises a shoulder 73 which extends in the axial direction and is formed circumferentially. The inner casing surface of safety element 7 can be enlarged by said shoulder 73. A partial longitudinal section of the front end of the inner casing tube is represented in FIG. 17, wherein slightly angled flexible tongues 72 and shoulder 73 extending in the axial direction are clearly apparent. Safety element 7 in the form of a retaining ring is formed from spring steel.

What is claimed is:

1. A steering column for a motor vehicle, comprising:
    a casing unit with a steering gear-side end and a steering wheel-side end, wherein the casing unit comprises:
        an outer casing tube, and
        an inner casing tube arranged telescopically within the outer casing tube;
    a steering spindle mounted rotatably about a longitudinal axis and within the inner casing tube, wherein the steering spindle comprises at least in portions a hollow shaft in which a steering shaft is arranged telescopically, and the steering spindle is mounted rotatably in a bearing in a steering wheel-side end portion of the casing unit;
    a safety element arranged longitudinally between the steering gear-side end of the casing unit and the bearing, and radially between the casing unit and the steering spindle, wherein the safety element comprises tongues that extend radially outward and directly contact the casing unit; and
    an energy-absorption apparatus disposed between the outer casing tube and the inner casing tube, wherein the energy-absorption apparatus is configured to brake a steering wheel coupled to the steering spindle in a controlled manner in a crash event as the steering column telescopically collapses.

2. The steering column of claim 1, wherein the safety element is arranged in a longitudinal region of the hollow shaft in which the steering shaft is sized and shaped to fit axially into the hollow shaft.

3. The steering column of claim 1, wherein the safety element is arranged in a longitudinal region in which the hollow shaft extends within the casing unit.

4. The steering column of claim 1, wherein the safety element is annular.

5. The steering column of claim 1, wherein the safety element is arranged within the casing unit.

6. The steering column of claim 5, wherein the safety element is arranged within the inner casing tube.

7. The steering column of claim 1, wherein the safety element is formed from a plastic material or from a spring steel.

8. The steering column of claim 1, wherein the safety element is configured to be at least partially friction-reducing.

9. The steering column of claim 1 wherein the energy absorption apparatus comprises at least one of a bending element or a rupturing element.

10. The steering column of claim 1 wherein the safety element is disposed longitudinally at an end region of the hollow shaft that is within 10% of a longitudinal length of the hollow shaft from an end of the hollow shaft.

11. The steering column of claim 1 wherein a vehicle-front end of the hollow shaft is disposed within 5% of a longitudinal length of the hollow shaft from a vehicle-front end of the inner casing tube.

12. The steering column of claim 1 wherein an end of the hollow shaft that protrudes from the casing unit is configured for attachment to the steering wheel.

13. The steering column of claim 1 wherein the safety element is comprised of a spring steel.

14. A steering column for a motor vehicle, comprising:
a casing unit with a steering gear-side end and a steering wheel-side end, wherein the casing unit comprises:
an outer casing tube, and
an inner casing tube arranged telescopically within the outer casing tube;
a steering spindle mounted rotatably about a longitudinal axis and within the inner casing tube, wherein the steering spindle comprises at least in portions a hollow shaft in which a steering shaft is arranged telescopically, and the steering spindle is mounted rotatably in a bearing in a steering wheel-side end portion of the casing unit;
a safety element arranged longitudinally between the steering gear-side end of the casing unit and the bearing, and radially between the casing unit and the steering spindle; and
an energy-absorption apparatus disposed between the outer casing tube and the inner casing tube, wherein the energy-absorption apparatus is configured to brake a steering wheel coupled to the steering spindle in a controlled manner in a crash event as the steering column telescopically collapses,
wherein the longitudinal axis intersects a plane that is orthogonal to the longitudinal axis, wherein tongues of the safety element are disposed radially outward and in a range of ±15° relative to the plane so as to directly contact the casing unit.

15. The steering column of claim 14 wherein the safety element is arranged in a longitudinal region in which the hollow shaft extends within the casing unit.

16. The steering column of claim 14 wherein the safety element is disposed longitudinally at an end region of the hollow shaft that is within 10% of a longitudinal length of the hollow shaft from an end of the hollow shaft.

\* \* \* \* \*